United States Patent [19]

Papenfuhs et al.

[11] 4,113,759
[45] Sep. 12, 1978

[54] METAL-CONTAINING DISAZOMETHINE COMPOUNDS, PROCESS FOR PREPARING THEM AND THEIR USE AS COLORANTS

[75] Inventors: Theodor Papenfuhs, Frankfurt am Main; Heinrich Volk, Bad Vilbel, both of Fed. Rep. of Germany

[73] Assignee: Hoechst Aktiengesellschaft, Frankfurt am Main, Germany

[21] Appl. No.: 799,001

[22] Filed: May 20, 1977

Related U.S. Application Data

[63] Continuation of Ser. No. 707,876, Jul. 22, 1976, abandoned.

[30] Foreign Application Priority Data

Jul. 30, 1975 [DE] Fed. Rep. of Germany ....... 2533947

[51] Int. Cl.² ............................................ C07F 15/04
[52] U.S. Cl. ........................ 260/439 R; 106/288 Q; 260/429 C; 260/429.9; 260/438.1
[58] Field of Search ............. 260/438.1, 439 R, 429.9, 260/429 C; 106/288 Q

[56] References Cited

U.S. PATENT DOCUMENTS

| | | | |
|---|---|---|---|
| 2,615,860 | 10/1952 | Burgess | 260/439 R |
| 3,440,254 | 4/1969 | Lenoir et al. | 260/429 R |
| 3,687,991 | 8/1972 | Gaeng et al. | 260/429 C |
| 3,875,200 | 4/1975 | L'Eplattenier et al. | 260/429 C |
| 3,895,041 | 7/1975 | Inman et al. | 260/439 R |
| 3,939,194 | 2/1976 | L'Eplattenier et al. | 260/429 C |
| 4,042,611 | 8/1977 | Papenfuhs et al | 260/439 R |
| 4,044,036 | 8/1977 | Hari et al. | 260/429 C |

*Primary Examiner*—Helem M. S. Sneed
*Attorney, Agent, or Firm*—Connolly and Hutz

[57] ABSTRACT

New metal-complex disazomethine compounds of the formulae

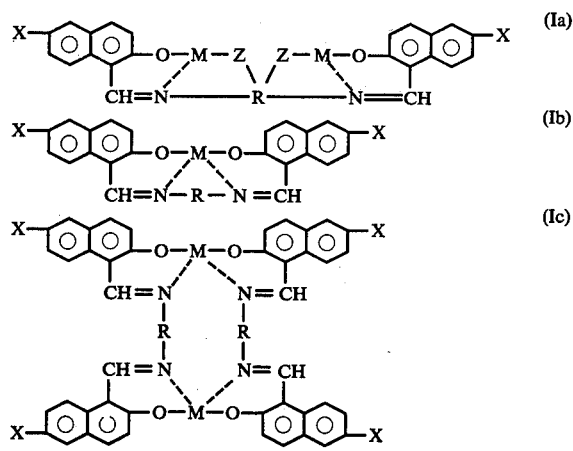

wherein R is a single bond, a straight-chained or branched alkylene radical which may be interrupted by one or more hetero atoms, such as 1, 2, 3 or 4 moieties selected from a group consisting of isocyclic and heterocyclic ring and other bivalent group, or is a cycloalkylene radical, an arylene or a heterocyclic radical, Z is a group capable of forming metal complexes, X is a carboxylic acid group, carboxylic acid ester group, an optionally substituted carboxylic acid amide or carboxylic acid hydrazide group and M is a bivalent metal atom, had been found which are very well suitable as colorants, especially as pigments, for example, for coloring plastic masses, paints, lacquers, for the use in spin-dyeing of viscose and cellulose acetate, for coloring printing pastes in graphic industry and paper masses, and have a high tinctorial strength, a good transparency, pure shades, excellent fastness to migration, to overvarnishing to light, to weather, to solvents and to heat, corresponding to the material colored with them.

8 Claims, No Drawings

METAL-CONTAINING DISAZOMETHINE COMPOUNDS, PROCESS FOR PREPARING THEM AND THEIR USE AS COLORANTS

This application is a continuation of application Ser. No. 707,876 filed July 22, 1976 and now abandoned.

The present invention relates to metal-containing disazomethine compounds, to a process for preparing them and to their use as colorants.

The novel compounds have the general formulae (Ia), (Ib) and (Ic)

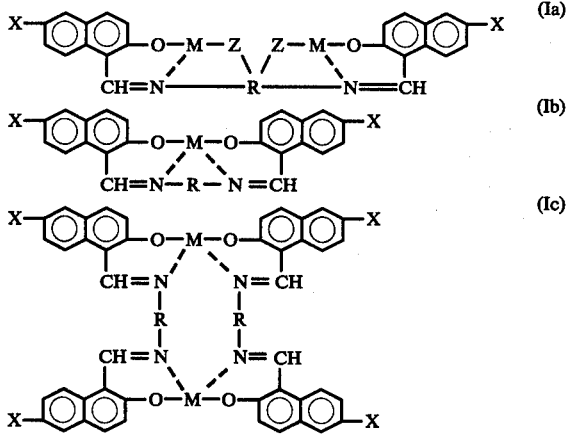

wherein R is a single bond, a straight-chained or branched alkylene radical which my be interrupted by one or more hetero atoms, such as 1, 2, 3 or 4 moieties selected from a group consisting of hetero atoms, isocyclic and heterocyclic rings, and other bivalent groups, or is a cycloalkylene radical, an arylene radical or a heterocyclic radical, Z is a group capable of forming metal complexes, X is a carboxylic acid group, carboxylic acid ester group, an optionally substituted carboxylic acid amide or carboxylic acid hydrazide group and M is a bivalent metal atom.

The invention especially concerns the compounds of the above-mentioned formulae (Ia) to (Ic), in which the radicals X in the same molecule have the same meaning and each radicals R or each Z, respectively, represents identical groups.

There are especially preferred compounds of the formulae (Ia) to (Ic), in which R is a simple bond, an alkylene radical having 2 to 8 carbon atoms which may be interrupted by a phenylene or cyclohexylene radical, or is a cyclcohexylene radical or a phenylene radical, which may be substituted preferably by 1 or 2 substituents thereof, by chlorine atoms, lower alkyl, especially methyl, ethyl, lower alkoxy, especially methoxy and ethoxy, nitro, trifluoromethyl, carboxylic acid-($C_1$-$C_5$)-alkyl ester groups, carboxylic acid amide, carboxylic acid phenyl amide, acetylamino, benzoylamino, sulfonic acid amide, sulfonic acid-($C_1$-$C_5$)-alkylamide and/or sulfonic acid phenyl amide groups, or R represents a naphthylene, quinoline, benzimidazolone or phthalimide radical, M stands for a copper, cobalt, nickel, zinc or manganese atom and Z for a —O—, —COO— or a lower alkoxy group, for example a methoxy or ethoxy group, or an amino group optionally substituted by lower alkyl or aryl radicals such as phenyl radicals, for example the -N(phenyl)-group, or a carboxylic acid-($C_1$-$C_5$)-alkyl ester radical, for example the carboxylic acid methyl ester group, or Z stands for the carbonamide group or for a sulfonic acid amide radical optionally substituted at one or two nitrogens by lower alkyl or aryl groups (phenyl groups).

There are furthermore preferred especially compounds of the formula (Ia), wherein R stands for the diphenylene radical, Z is oxygen or the radical of the formula —CO—O—, the carbonyl group of it being bound to the radical R, the X are identical or different, preferably identical, and each of it stands for the carboxylic acid group, a carboxylic acid-($C_1$-$C_4$)-alkylester group, carboxylic acid amide or carboxylic acid methyl amide group, and M is a copper atom, furthermore compounds of the formula (Ib) wherein R is an alkylene radical having 2 to 6 carbon atoms which may be interrupted by, preferably 1 or 2, groups of the formula —NH— or —N(CH$_3$)—, or is the ortho-phenylene radical which may be substituted by preferably 1 or 2, substituents selected from the group consisting of chlorine, methyl, ethyl, nitro, carboxy, carbomethoxy, carbethoxy, from the two last compounds preferably carbomethoxy, carboxylic acid amide, carboxylic acid phenylamide, acetylamino, benzoylamino, and sulfonic acid phenylamide, and the X are identical or different, preferably identical, and each of it represents the carboxylic acid group, a carboxylic acid-($C_1$-$C_4$-alkyl)-ester group, the carboxylic acid amide group, a carboxylic acid-($C_1$-$C_4$-alkyl)-amide group, carboxylic acid-di-($C_1$-$C_4$-alkyl)-amide group, carboxylic acid phenylamide or carboxylic acid phenylhydrazide group, and M stands for nickel, as well as compounds of the formula (Ic) wherein the X are identical or different, preferably identical, and each of it stands for the carboxylic acid group, carboxylic acid amide, carbomethoxy or carbethoxy group and R represents in each case a covalent bond and M is nickel.

Among these compounds, those of the formula

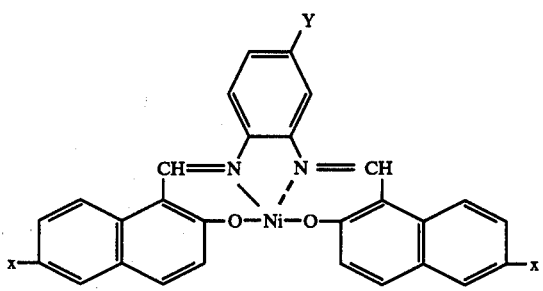

are particularly interesting in which Y stands for hydrogen, methyl or carboxy, and the X are identical or different, preferably identical, and each of it represents the carboxy, carboxylic acid amide or carboxylic acid phenylamide group; the nickel complex compounds of the Examples 24, 28, 32, 36 and 39 may be particularly mentioned.

The compounds of the invention may be prepared by condensing one mol of one or several amines of the formula (II)

$$H_2N - R - NH_2 \qquad (II)$$

wherein R has the above meaning, with 2 mols of one or several compounds of the formula (III)

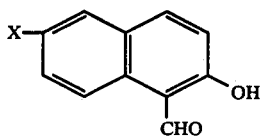

wherein X has the above meaning, and metallizing the disazomethine compounds simultaneously or in a following process step.

The condensation of the diamines of the formula (II) with compounds of the formula III may be carried out in water and in an organic solvent, such as an aliphatic alcohol, an aliphatic carboxylic acid, dimethylformamide, xylene, chlorobenzene, o-dichlorobenzene, nitrobenzene or glycol ethers. It generally proceeds fast and quantitatively, at a temperature of 50° to 100° C. It may be useful to work in a solvent or in a mixture of solvents at a higher temperature, for example at 150° C. or above, and to effect simultaneously an azeotropic distillation of the water set free by condensation.

The preparation of metal complex compounds may be carried out as follows: the condensation described above of the amine of the formula II with compounds of the formula III takes place in the presence or with the addition of the metal-yielding agents, or the metalfree dyestuff prepared first and optionally isolated is subsequently treated with the metal-yielding agents, using water or in an organic solvent or solvent mixture, for example one of the above solvents, and optionally maintaining exact pH conditions and defined temperatures.

Metallization is generally carried out according to usual analogous processes, for example at temperatures between 60° C. and 120° C. and at a pH value of from 3 to 9, preferably 3.5 to 6; but in the preparation of the compounds of the formula (Ic) a pH value above 7, preferably from 7 to 9 has to be observed.

Instead of the free amines of the formula (II), also their salts, for example the chlorhydrates or sulfates, may be used for the reaction with the compounds of the formula (III), optionally in the presence of an acid-binding agent, such as an alkaline or alkaline earth carbonate or -hydroxide.

The diamines of the formula (II) to be used as starting compounds are for example hydrazine, aliphatic diamines having a straight-chained or branched alkylene radical of 2 to 8 carbon atoms which may be interrupted by hetero atoms, such as oxygen, sulfur or nitrogen atoms, by isocyclic radicals, for example cycloalkylene or a phenylene radical or by other bivalent groups or are cycloaliphatic diamines, such as cyclopentylene or cyclohexylene diamines, aromatic diamines of the benzene, naphthalene or anthraquinone series as well as those of the general formulae

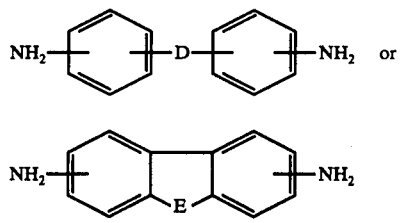

wherein D is a single bond, an oxygen or sulfur atoms, a —NH— group, —N(alkyl—1—4)—, —CH$_2$—, —CH=CH—, —CO—, —CONH—, —NHCONH—, —CO—NH—CO—NH—, —SO—, —SO$_2$—, —SO$_2$NH— or —N=N— group, E is an oxygen or sulfur atom, a —NH—, —N(alkyl 1-4)—, —CH$_2$—, —CO—, —CH=CH—, —CONH—, —NHCONH—, —SO$_2$—, —SO$_2$NH— or —N=N— group and the aromatic nuclei, each may be substituted by one or several, preferably 1 or 2 substituents selected from a group consisting of halogen, such as chlorine, bromine, nitro, lower alkyl, cyano, trifluoromethyl, hydroxy, amino, lower alkylamino, arylamino such as phenylamino, lower alkoxy, carboxy, carboxylic acid —(C$_1$-C$_5$-alkyl)—ester, carboxylic acid hydrazide, hydroxamic acid, sulfonic acid ester, sulfonic acid amide optionally substituted such as by lower alkyl and/or phenyl and acylamino of an aliphatic lower carboxylic acid or aromatic carboxylic acid, such as acetyl amino, propionyl amino or benzoylamino; furthermore suitable amines are heterocyclic diamines, for example diaminopyridines. Preferred diamines are diamines with carbonamide groups, especially with cyclic carbonamide groups, especially diamines of the general formula

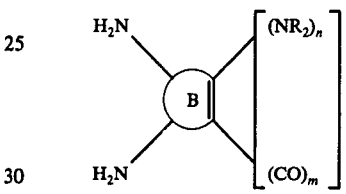

wherein R$_2$ is hydrogen, a lower alkyl or phenyl radical, and m and n, identical or different, each is 1 or 2, whereby the sum of m and n is 3 or 4, and the group of the formula [(NR$_2$)$_n$(CO)$_m$] in which —NR$_2$— and —CO— are in any desired arrangement to each other, forms together with two ortho-standing carbon atoms of the ring system B a five- or six-membered heterocyclic ring; furthermore there are especially preferred diamines of the formula (II) which are substituted in o-position to one of the amino groups by a ligand Z which is capable of forming a metal complex wherein Z is preferably hydroxy, lower alkoxy, carboxy amino, amino substituted by lower alkyl and/or aryl radicals (phenyl radicals), a carboxylic acid-(C$_1$-C$_5$)-ester group, carboxylic acid amide or a sulfonic acid amide unsubstituted or substituted at the one or two N-atoms by lower alkyl and/or aryl groups (phenyl groups).

As metals M are preferred for example chromium, manganese and iron, especially zinc and cobalt and especially preferred copper and nickel.

The aldehyde of the formula (III) used as starting compounds are compounds easy to prepare. For preparing them, for example compounds of the formula IV

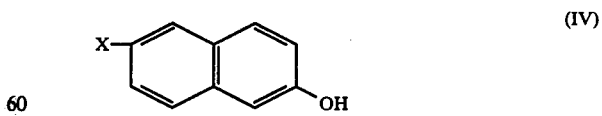

in which X has the above meaning, are reacted in lower aliphatic carboxylic acids with hexamethylene tetramine.

The novel compounds are valuable colorants, preferably as pigments, and are suitable, — especially after a conditioning usual for pigment dyestuffs —, for example for coloring plastic masses which are masses which either are free from solvents and contain a solvent or are free from softening agents or contain a softening agent of plastics or synthetic resins, for the pigmentation of paints on an oily or aqueous base as well as of lacquers of different types, for the spin-dyeing of viscose and cellulose acetate or for the pigmentation of polyethylene, polystyrene, polyvinyl chloride, caoutchouc and synthetic leather. They may also be used in printing pastes for graphic industry, for coloring paper masses, for the coating of textiles or pigment printing.

The dyeings obtained have an excellent fastness to migration, to light, to weather and to solvents; they shows an excellent fastness to heat and are characterized by a high tinctorial strength, a good transparency and frequently by surprisingly pure shades.

The following Examples illustrate the invention. Parts and percentages are by weight unless stated otherwise.

EXAMPLE 1

21.6 Parts of 1-formyl-2-hydroxy-6-naphthoic acid are added, while stirring, to a solution of 3.0 parts of 1,2-diaminoethane, in 250 parts of ethanol and 10 parts of glacial acetic acid, and heated for 3 hours at the boil. After cooling the yellow compound is suction-filtered and washed well with ethanol. The moist product is then introcuded into 150 parts of dimethylformamide, mixed with 9.0 parts of nickel diacetate and heated for 4 hours at 120° C. The yellow pigment thus obtained is filtered hot, washed well, first with water, then with ethanol. After drying 30.2 parts of the yellow pigment of the formula

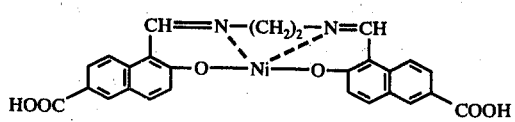

with the analysis: Ni calculated: 11.4%: found: 11.3%, are obtained, which dyes polyvinyl chloride in a clear yellow shade having excellent fastness properties.

EXAMPLE 2

21.6 Parts of 1-formyl-2-hydroxy-6-naphthoic acid, 3.0 parts of diaminoethane and 9.0 parts of nickel diacetate are heated in 300 parts of ethanol for 5 hours at the boil. The yellow compound is then filtered hot and washed well with hot water and ethanol. The product is then heated in 150 parts of dimethylformamide for 1 hour at 120° C., filtered hot and washed well with hot water and ethanol. After drying 31.0 parts of a yellow pigment are obtained which is identical with the pigment obtained according to Example 1.

In similar and analogous manner as described in the above Examples 1 or 2, also the following nickel complex compounds listed in the subsequent Table 1 according to the following formula with R and X indicated therein, can be prepared:

TABLE 1

| Example | R | X | Shade in polyvinyl chloride (PVC) |
|---|---|---|---|
| 3 | —CH$_2$CH$_2$— | —COOCH$_3$ | yellow |
| 4 | —CH$_2$CH$_2$— | —COOCH$_2$CH$_2$CH$_3$ | yellow |
| 5 | —CH$_2$CH$_2$— | —CONH$_2$ | yellow |
| 6 | —CH$_2$CH$_2$— | —CONHCH$_3$ | yellow |
| 7 | —CH$_2$CH$_2$— | —CONHCH$_2$CH$_2$CH$_3$ | yellow |
| 8 | —CH$_2$CH$_2$— | —CON(C$_4$H$_9$)$_2$ | yellow |
| 9 | —CH$_2$CH$_2$— | —CONHCH$_2$CH$_2$N(CH$_3$)$_2$ | yellow |
| 10 | —CH$_2$CH$_2$— | —CONH—C$_6$H$_5$ | yellow-green |
| 11 | —CH$_2$CH$_2$— | —CONHNH—C$_6$H$_5$ | yellow-green |
| 12 | —(CH$_2$)$_4$— | —COOH | yellow-green |
| 13 | —(CH$_2$)$_6$— | —COOH | yellow-green |
| 14 | —(CH$_2$)$_3$NH(CH$_2$)$_3$— | —COOH | yellow-green |
| 15 | —(CH$_2$)$_3$N(CH$_3$)(CH$_2$)$_3$— | —COOH | yellow-green |
| 16 | —(CH$_2$)$_6$— | —COOCH$_3$ | yellow-green |

EXAMPLE 17

22.9 Parts of 1-formyl-2-hydroxy-6-naphthoic acid methyl amide are introduced, while stirring, to 12.2 parts of 3,3'-dimethoxy-4,4'-diaminodiphenyl in 200 parts of ethanol and 10 parts of glacial acetic acid, and the whole is refluxed for 4 hours. The red compound is suction-filtered, washed well with ethanol and then introduced again into 300 parts of ethanol. 21.0 Parts of copper acetate are added and the mixture is heated for 6 hours at the boil. The yellow pigment is filtered hot and washed well with hot water and ethanol. After drying 34.6 parts of the compound of the formula

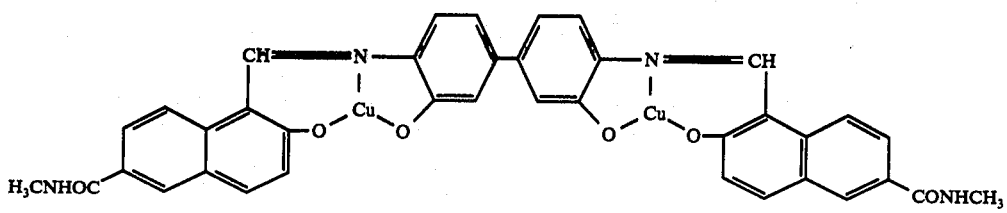

are obtained.

Analysis: Cu calculated: 16.7%: found: 16.9%.

The pigment thus obtained dyes polyvinyl chloride in a dull yellow shade having very good fastness properties.

According to analogous processes as described above, the copper complex compounds listed in the following Table 2 corresponding to the following general formula

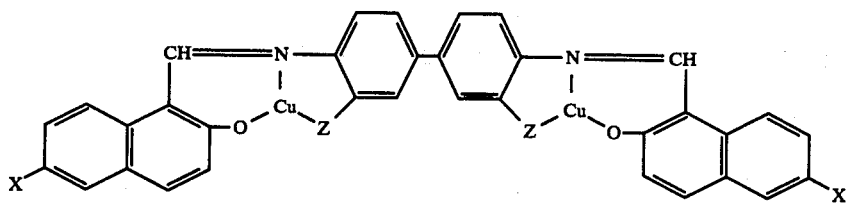

with X and Z indicated therein, can be prepared:

TABLE 2

| Ex. | X | Z | Shade in PVC |
|---|---|---|---|
| 18 | —COOH | —O— | yellow brown |
| 19 | —COOCH₃ | —O— | " |
| 20 | —CONH₂ | —COO— | " |
| 21 | —COOH | —COO— | " |
| 22 | —COOCH₃ | —COO— | " |
| 23 | —CO—OCH₂CH₂CH₂CH₃ | —COO— | " |

EXAMPLE 24

5.4 Parts of 1.2-diaminobenzene are dissolved in 170 parts of ethanol and 10 parts of glacial acetic acid. While stirring, 21.6 parts of 1-formyl-2-hydroxy-6-naphthoic acid are introduced, and the solution is heated at the boil for three hours.

The yellow bis-azomethine is filtered hot, washed well with ethanol and then introduced in the moist state into 200 parts of dimethylformamide. The mixture is heated to 100° C., and then 9.0 parts of nickel diacetate are added. After heating for 3 hours, the red pigment prepared is filtered and washed well with hot water and ethanol. After drying 33.4 parts of the pigment of the formula are obtained. Analysis: Ni calculated: 10.5%: found: 10.3%.

The pigment dyes polyvinyl chloride in a brownish red having an excellent fastness to bleeding.

EXAMPLE 25

2.8 Parts of 1,2-diaminobenzene and 11.3 parts of 1-formyl-2-hydroxy-6-naphthoic acid are heated in 100 parts of dimethylformamide for 1 hour at 120° C. Then 4.5 parts of nickel diacetate are added and heated for 3 hours at 120° C. The red compound is filtered hot and washed well with hot water and ethanol. After drying 14.2 parts of a red pigment are obtained, which is identical with the pigment prepared according to Example 24.

In corresponding way as described in the previous Examples the nickel comples compounds listed in the following Table 3 and corresponding to the following formula

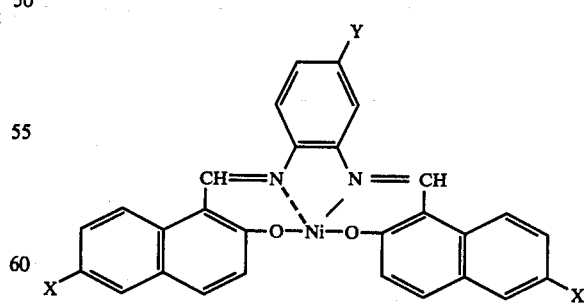

with X and Y indicated in the Table, are obtained.

TABLE 3

| Example | X | Y | Shade in PVC |
|---|---|---|---|
| 26 | —COOCH₃ | H | orange |
| 27 | —COOCH₂CH₂CH₂CH₃ | H | orange |
| 28 | —CONH₂ | H | red |

TABLE 3-continued

| Example | X | Y | Shade in PVC |
|---|---|---|---|
| 29 | —CONHCH₃ | H | red |
| 30 | —CONHCH₂CH₂CH₂CH₃ | H | red |
| 31 | —CONHCH₂CH₂N(CH₃)CH₃ | H | red |
| 32 | —CONH—C₆H₅ | H | orange |
| 33 | —CONHNH—C₆H₅ | H | orange |
| 34 | —COOH | NO₂ | red |
| 35 | —COOH | Cl | red |
| 36 | —COOH | CH₃ | red |
| 37 | —COOH | —NHCOCH₃ | red |
| 38 | —COOH | —NHCO—C₆H₅ | " |
| 39 | —COOH | —COOH | " |
| 40 | —COOH | —CONH₂ | " |
| 41 | —COOH | —CONH—C₆H₅ | " |
| 42 | —COOH | —SO₂NH—C₆H₅ | " |
| 43 | —CONH₂ | —NO₂ | " |
| 44 | —CONHCH₂CH₂CH₂CH₃ | —COOH | " |
| 45 | —CONHCH₂CH₂CH₂CH₃ | —COOCH₃ | " |
| 46 | —COOCH₃ | —COOCH₃ | " |

EXAMPLE 47

11.5 Parts of formyl-2-hydroxy-6-naphthoic acid methyl ester are added, while stirring, to 1.5 parts of a 80% b. w. hydrazine hydrate in 150 parts of ethanol. The mixture is heated at the boil for 3 hours. The 3 parts of sodium-acetate and 4.5 parts of nickel diacetate are added, and the whole is heated again for 5 hours at the boil. The pH value is constantly maintained above 7 with the aid of diluted aqueous sodium hydroxide solution.

The yellow compound is then filtered hot, washed well with hot water and ethanol. After drying 14.3 parts of a yellow pigment is obtained which corresponds to the formula Ic wherein R is a single bond, M is Ni and X is —COOCH₃.

A lacquer pigmented therewith and having been used for coating shows a good fastness to overvarnishing and to light.

EXAMPLE 48

11.5 Parts of 1-formyl-2-hydroxy-6-naphthoic acid methyl ester are added, while stirring, to 1.5 parts of a 80% b.w. hydrazine hydrate in 150 parts of ethanol. The mixture is heated at the boil for 3 hours, and the yellow compound is filtered hot, washed well with ethanol and introduced in the moist state into 100 parts of dimethylformamide. 5.0 Parts of nickel diacetate and 30 parts of sodium acetate are added at 100° C., and the mixture is stirred for 5 hours at this temperature. The yellow complex compound thus obtained is filtered at 30°–40° C. and washed well with hot water and ethanol. After drying, 9.8 parts of a yellow pigment are obtained which is identical to the pigment obtained according to Example 47.

If in Example 47 the 1-formyl-2-hydroxy-6-naphthoic acid methyl ester is replaced by one of the aldehydes listed in Table 4, the corresponding nickel complex compounds corresponding to the general formula (Ic) with R and X indicated therein, are obtained,

TABLE 4

| Example | Aldehyde | R | X | Shade in lacquer |
|---|---|---|---|---|
| 49 | (CHO, OH naphthalene with H₂NC(O)— substituent) | — | CONH₂ | yellow |
| 50 | (CHO, OH naphthalene with HO—C(O)— substituent) | — | COOH | yellow |

We claim:

1. A metal-complex disazomethine compound of the formula

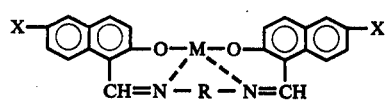

wherein R is phenylene or phenylene substituted by one or two substituents selected from the group consisting of chlorine, lower alkyl, lower alkoxy, nitro, trifluoromethyl, carboxylic acid (C₁-C₅-alkyl)ester, carbonyl amide, carbonyl phenylamide, acetylamino, benzoylamino, sulfonic acid amide, sulfonic acid (C₁-C₅-alkyl)-amide and sulfonic acid phenylamide, X is carboxy, carboxylic acid (C₁-C₄-alkyl)ester, carboxylic acid amide, carboxylic acid N-(C₁-C₄-alkyl)-amide or carboxylic acid phenylamide, and M is copper, nickel or zinc.

2. A metal-complex disazomethine compound of the formula

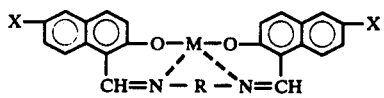

wherein R is ortho-phenylene or ortho-phenylene substituted by one or two substituents selected from the group consisting of
chlorine, methyl, ethyl, nitro, carboxy, carbomethoxy, carbethoxy, carbonyl amide, carbonyl phenylamide, acetylamino, benzoylamino and sulfonic acid phenylamide, each X is carboxy, carboxylic acid (C₁-C₄-alkyl) ester, carboxylic acid amide, carboxylic acid (C₁-C₄-alkyl)-amide, carboxylic acid-di-(C₁-C₄-alkyl)-amide or carboxylic acid phenylamide, and M is nickel.

3. A compound as claimed in claim 2 of the formula

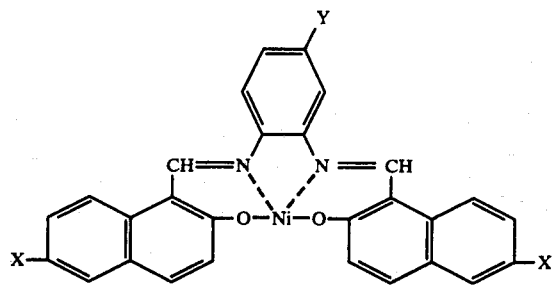

wherein Y is hydrogen, methyl or carboxy, and X is carboxy, carboxylic acid amide or carboxylic acid phenylamide.

4. A compound according to claim 2, wherein Y is hydrogen and each X is carboxy.

5. A compound according to claim 2, wherein Y is hydrogen and each X is carboxylic acid amide.

6. A compound according to claim 2, wherein Y is hydrogen and each X is carboxylic acid phenyl amide.

7. A compound according to claim 2, wherein Y is methyl and each X carboxy.

8. A compound according to claim 2, wherein Y and X are carboxy.

* * * * *